United States Patent [19]

Cortes Guasch et al.

[11] Patent Number: 5,706,916
[45] Date of Patent: Jan. 13, 1998

[54] PAD AND DISC BRAKE USING IT

[75] Inventors: Esteve Cortes Guasch; Juan Simon Bacardit; J. Manuel Vila Boluda, all of Drancy, France

[73] Assignee: Bosch Sistemas De Frenado S.L., Madrid, Spain

[21] Appl. No.: 492,092

[22] PCT Filed: Jul. 10, 1995

[86] PCT No.: PCT/FR95/00918

§ 371 Date: Aug. 10, 1995

§ 102(e) Date: Aug. 10, 1995

[87] PCT Pub. No.: WO96/03595

PCT Pub. Date: Feb. 8, 1996

[30] Foreign Application Priority Data

Jul. 28, 1994 [FR] France ................. 94 09342

[51] Int. Cl.$^6$ ............................... F16B 65/09
[52] U.S. Cl. ............... 188/73.38; 188/73.37; 188/73.36; 188/73.35
[58] Field of Search ............... 188/73.1, 72.4, 188/72.5, 73.31, 73.35, 73.36, 73.37, 73.38, 234

[56] References Cited

U.S. PATENT DOCUMENTS

| | | | |
|---|---|---|---|
| 3,980,160 | 9/1976 | Hoffmann | 188/73.5 |
| 4,609,077 | 9/1986 | Nakatsuhara | 188/73.38 |
| 4,662,482 | 5/1987 | Bass | 188/73.38 |
| 5,284,228 | 2/1994 | Weiler | 188/73.38 |
| 5,609,228 | 3/1997 | Le Deit | 188/73.35 |

*Primary Examiner*—Robert J. Oberleitner
*Assistant Examiner*—C. T. Bartz

[57] ABSTRACT

A disc brake having a caliper (1) which straddles a brake disc (D) and a carrier (2) which is fixed to a vehicle. A cylinder (3) is secured to the caliper and closed by a piston 31. Guides (21a,21b,22a,22b) allow the caliper to slide with respect to the carrier (2) in response to an input to bring first (41) and second (42) friction pads into engagement with the brake disc (D) to effect a brake application. At least one of the first (41) and second (42) friction pads has ears (41a,42a) inserted in corresponding housings in the carrier (2). The housing constitutes guides for each ear which engage a lateral star-shaped spring (52a). The star-shaped spring (52a) provides a recoil which moves the first (41) and second (42) pads away from the brake disc (D) after each braking application.

6 Claims, 4 Drawing Sheets

5,706,916

PAD AND DISC BRAKE USING IT

The present invention relates to a braking device for a motor vehicle including at least one pad having two substantially flat faces, the first of which is partially covered, in a central region, with a friction material, this pad further including, on either side of this central region, two lateral ears, each having a relatively large width, in a first direction substantially perpendicular to the second direction joining these ears, the central region being connected to the two ears by respective connection zones having a relatively small width in the first direction so that outside of the connection zone each ear has a periphery which is greater than the width of this zone.

Devices in accordance with this definition, which encompasses a certain number of disc brakes, are well known in the prior art, as shown, for example, by document U.S. Pat. No. 4,044,864.

A very long-standing problem posed in disc brakes, particularly those which use pads of the type identified above, is that of returning the caliper to its position of rest after the brake has been actuated.

Indeed, it often happens that the pad facing the opposite face of the disc from that towards which the piston is pointing rubs on the disc even when the brake is not actuated, and wears prematurely, whilst unduly slowing the vehicle down.

The invention falls within this context, and its object is to propose a braking device which, although being a simple structure, solves the problem of returning the caliper to its position of rest as soon as the brake is released.

To this end, the brake of the invention, which moreover conforms to the preamble above, is essentially characterized in that each pad ear carries, on its second face at least, a lateral pad spring which is connected to this ear by its central part and which overhangs the periphery of this ear at least at two points which are spaced apart from one another along this periphery.

Preferably, the braking device comprises first and second friction pads of the type described previously, and is characterized in that it further comprises: two brake elements which can move with respect to each other, one of which is a caliper straddling a brake disc, and the other of which is a carrier fixed to the vehicle; clamping means comprising a cylinder bearing on the caliper and having, facing a first of the two faces of the disc, an opening closed by a piston; and guide means allowing the caliper to slide with respect to the carrier when the clamping means are actuated, the first and second friction pads pointing respectively towards the first and second faces of the disc, being trapped between the piston and the caliper, and moved in a third direction by actuation of the clamping means in order to be applied to the disc, and in that the ears of at least one of the pads are set into respective housings of the carrier, each of which extends in the third direction and has an opening pointing in the second direction and of size less than that of the width of the ear which it receives.

For example, it is possible to make provision for the cylinder to be engaged in a ring secured to the carrier, and with respect to which the cylinder can slide under the effect of a braking force.

The caliper may then be fastened removably to the second pad in order to be secured to the latter in the first direction, radially with respect to the disc, the ears of the second pad, preferably of circular shape, being engaged in the said housings in the carrier.

In order to secure the second pad and the caliper to one another, the latter may have a slit extending in the third direction, the second pad having at least one projection passing through this slit, and a central spring fastened to this projection bearing on one edge of the slit.

Under these conditions it is possible to make provision for the caliper to rest freely on the ring.

Preferably, each lateral pad spring essentially assumes the shape of a star including at least three branches, and this star-shaped spring is riveted at its centre to the pad by means of a rivet having a rim distant from the spring in the latter's position of rest, and serving to limit the deformation of this spring.

Finally, each pad ear is preferably protected by a cylindrical cup produced from a rustproof material and held on the first face of the pad.

Other characteristics and advantages of the invention will emerge clearly from the description thereof which is given hereafter, by way of non-limiting indication, with reference to the appended drawings in which.

Figure 1:
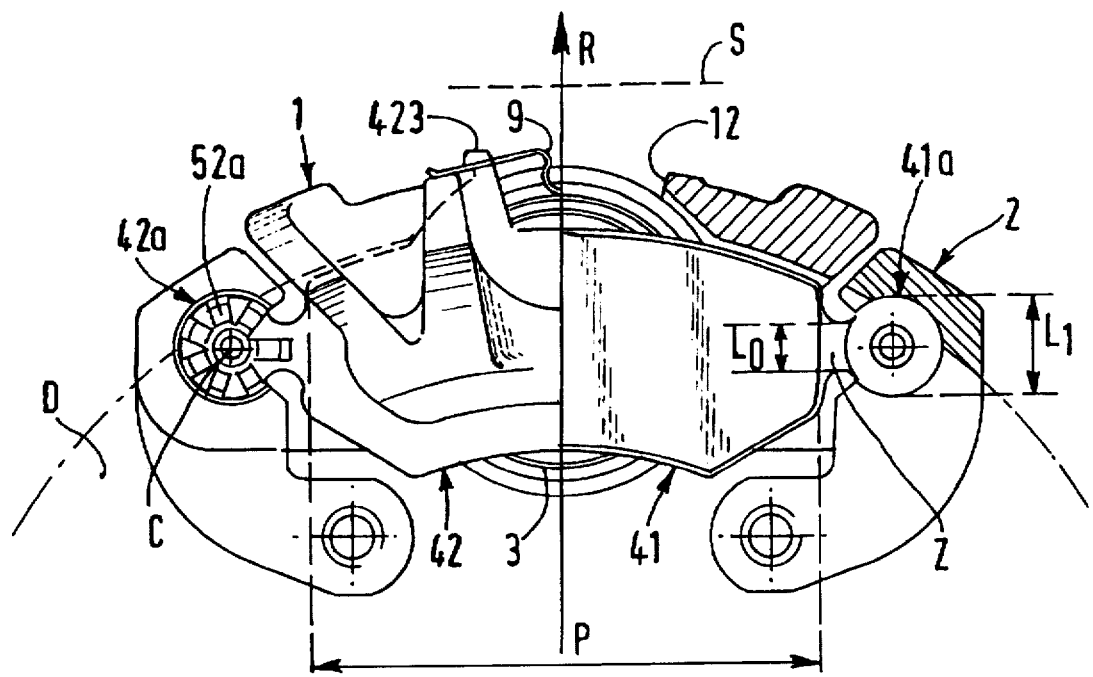
FIG. 1 is, in its right-hand part, a view in partial section taken along the line I—I of FIG. 11, of a complete braking device, in accordance with the invention, and, in its left-hand part, an external view of this device in the direction of the arrow I of FIG. 11.

As the figures show, the invention relates generally to a disc brake, such a brake conventionally comprising: two brake elements which can move with respect to each other, one of which is a caliper 1 straddling a brake disc D (FIG. 11), and the other of which is a carrier 2 fixed to the vehicle; clamping means comprising a cylinder 3 bearing on the caliper 1 and, opposite a first face D1 of the disc D, having an opening 30 closed by a piston 31; guide means, which will be specified subsequently and which allow the caliper 1 to slide with respect to the carrier 2 when the clamping means are actuated, and first and second friction pads 41 and 42.

These first and second friction pads 41 and 42 point respectively towards the first and second faces D1 and D2 of the disc D (FIG. 11), are trapped between the piston 31 and the tip 10 of the caliper 1, and can be moved in the direction A, axially with respect to the disc, by an increase in pressure in the cylinder 3, by virtue of which the piston 31 on the one hand, and the tip 10 of the caliper 1 on the other, apply them to the disc D.

Each pad, such as 41 or 42, includes two substantially flat faces such as 411, 412 and 421, 422, the first 411, 421 of which is partially covered, in a central region P (FIG. 1), with a friction material F.

Each pad furthermore includes, on either side of this central region P, two lateral ears of circular shape such as 41a, 41b and 42a, 42b, each of which (FIG. 1), in a direction R substantially radial with respect to the disc, therefore substantially perpendicular to the direction S of a secant to the disc which joins these ears, has a relatively large width L1, the central region P being connected to the two ears by respective connection zones Z which, in the radial direction R have a relatively small width Lo.

Figure 9:
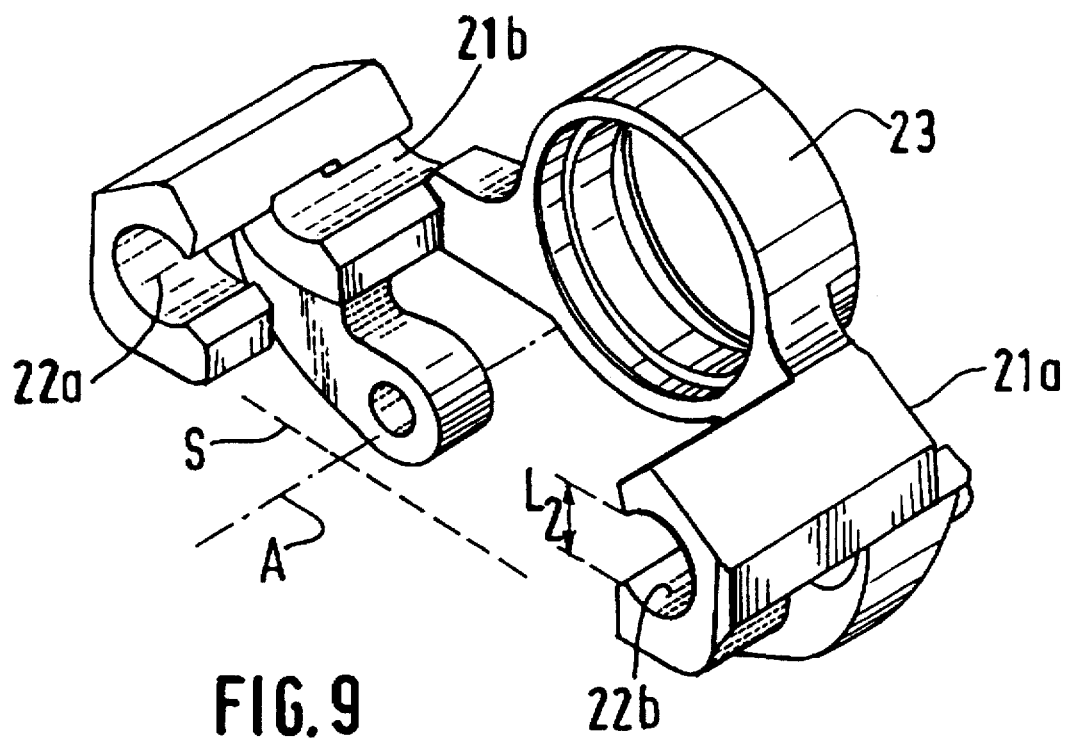
FIG. 9 is a perspective view of the carrier of a braking device in accordance with the invention.

Under these conditions, each ear has, away from its connection zone Z, a periphery greater than the width Lo of this zone, and may be set into a corresponding housing in the carrier, such as 21a, 21b, 22a, or 22b (FIG. 9), which extends in the axial direction A and which has an opening pointing in the secant direction S and of size L2 less than that of the width L1 of the ear which it receives.

According to the invention, each ear, at least on the second face such as 412 or 422 of the pad, has a lateral spring such as 51a, 51b, 52a and 52b which is connected to this ear by its central part C (FIG. 8) and which overhangs the periphery of this ear at least at two points such as 521, 522, which are spaced apart from one another along this periphery.

Figure 8:
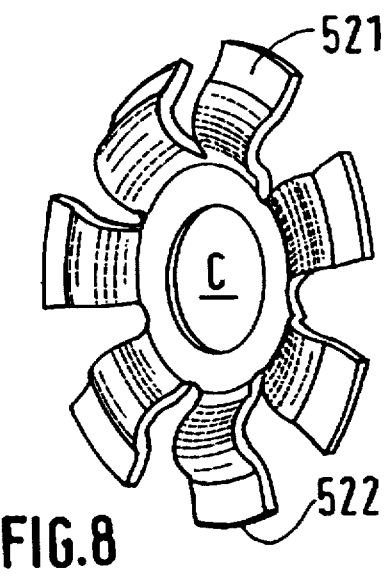
FIG. 8 is a perspective view of a lateral pad spring in accordance with the invention.

As FIG. 8 shows, each pad spring preferably assumes the shape of a star including at least three branches, and in this case seven.

Each lateral pad spring (FIGS. 3 to 7) is preferably held at its centre on the pad by means of a rivet such as 520 which passes through the lug of the pad at its centre.

As FIGS. 3 to 7 show, the rivet 520, at least on the same side as the spring 52b, has a rim 521 distant from the spring in the latter's position of rest and serving to limit the deformation of this spring.

Figure 3:
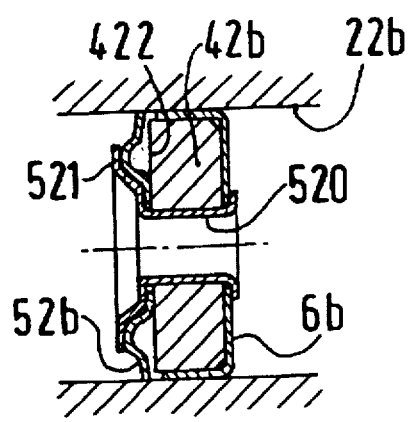
FIG. 3 to 7 illustrate, in different positions, a pad in accordance with the invention as viewed in section in the region of one of its lateral springs.
Figure 4:
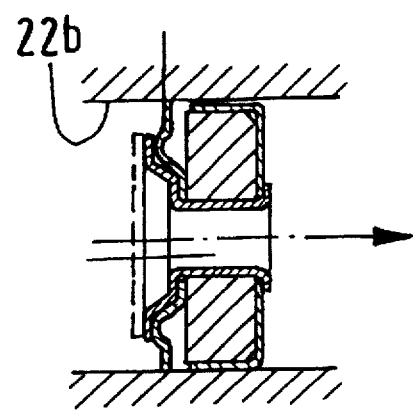
Figure 5:
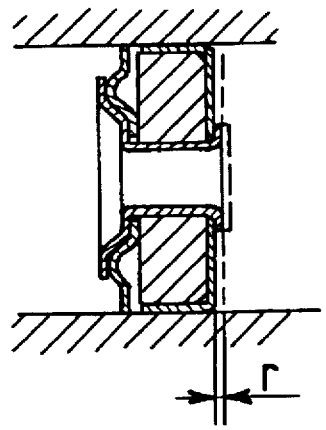
Figure 6:
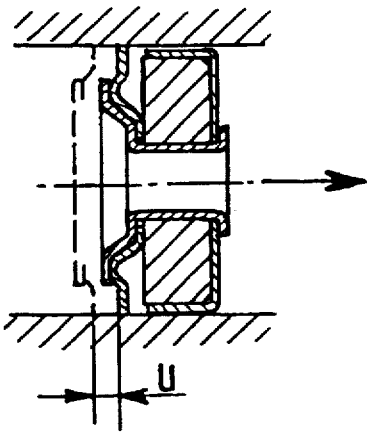
Figure 7:
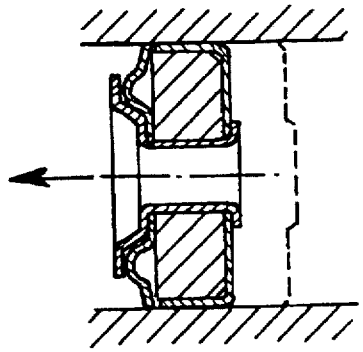

More precisely, FIG. 3 illustrates the state of rest of the pad 42. In the event of actuation of the brake (FIG. 4), this pad is urged in the direction of the arrow and the lateral spring 52b, which bears on the inside of the housing 22b, follows the ear in its movement only with a delay resulting from the elastic deformation of this spring, which forces it to bear on the rim 521. When the pad stops being urged (FIG. 5), the lateral spring 52b resumes its position of rest bringing about a recoil "r" of the pad with respect to the disc. In proportion to the wear "u" of the friction material F, the pad advances towards the disc, as FIG. 6 represents, FIG. 6 being similar to FIG. 4. Removal of the worn pad in order to replace it gives rise to a deformation of the spring 52b in the opposite direction from that which the latter undergoes during braking.

As shown again by FIGS. 3 to 7, each pad ear may be protected by a cylindrical cup such as 6b made from a rustproof material and held on the first face of the pad, such as 421, by the rivet 520.

In the preferred embodiment of the invention, the cylinder 3 is engaged in a ring 23 secured to the carrier (FIGS. 9 and 11) and with respect to which this cylinder can slide under the effect of a braking force.

For example, the axial position of the cylinder 3 with respect to the ring 23 is fixed by a circular spring 7, secured to the ring in the axial direction A, trapping the cylinder 3 and nevertheless allowing the latter to slide during braking.

Figure 11:
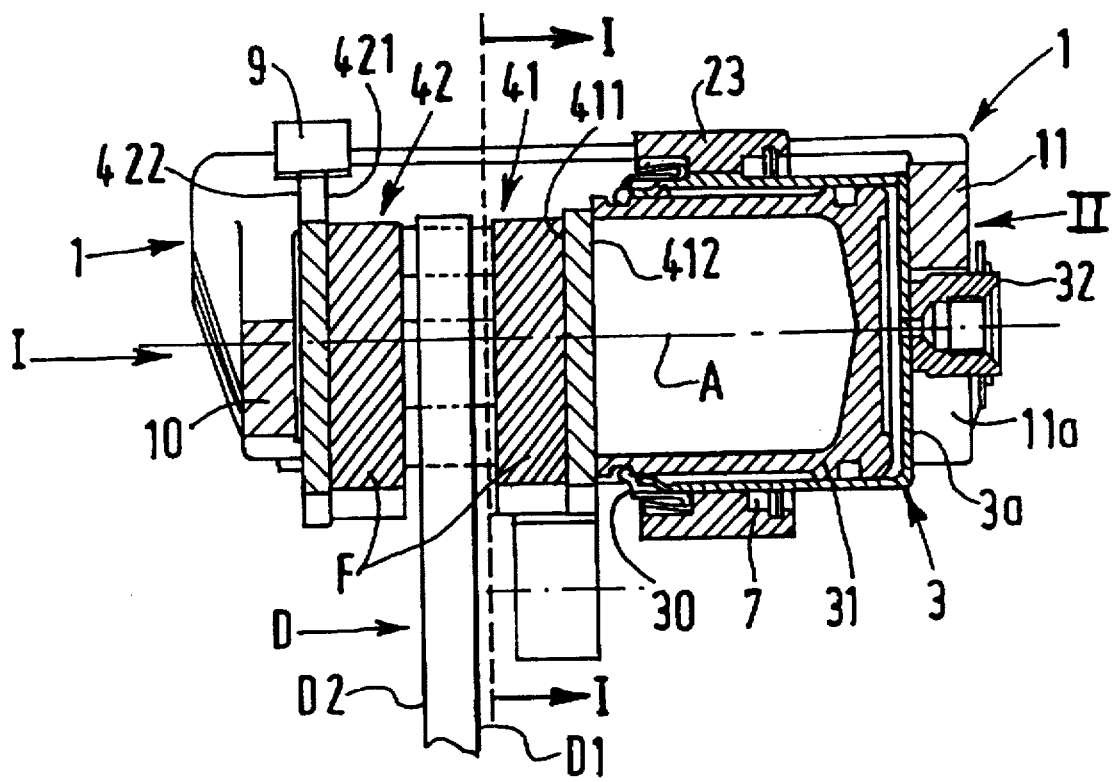
FIG. 11 is a view in section of a braking device in accordance with the invention.
Figure 12:
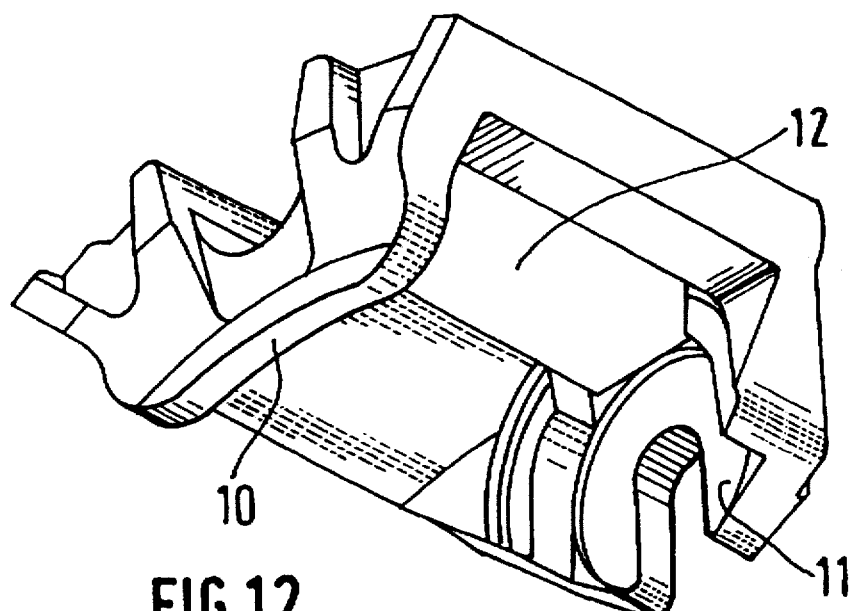
FIG. 12 is a perspective view of the caliper of a braking device in accordance with the invention, viewed from the same side as its tip.

As FIG. 11 shows, the bottom 3a of the cylinder 3 bears on the bottom 11 of the caliper, located on the opposite side from the tip 10 of the latter, the pressure inlet 32 of the cylinder 3 passing through an opening 11a in the bottom 11, and being secured to this bottom by a locking member 8.

By virtue of this layout, the cylinder always adopts, with respect to the ring 23, a position which allows the wear "u" on the lining F of the pad to be taken up.

Moreover, in so far as the ears 42a, 42b of the second pad 42 are engaged in the housings 22a, 22b of the carrier 2 it is sufficient, in order to hold the caliper, to secure the latter to the second pad in the radial direction R.

Figure 2:
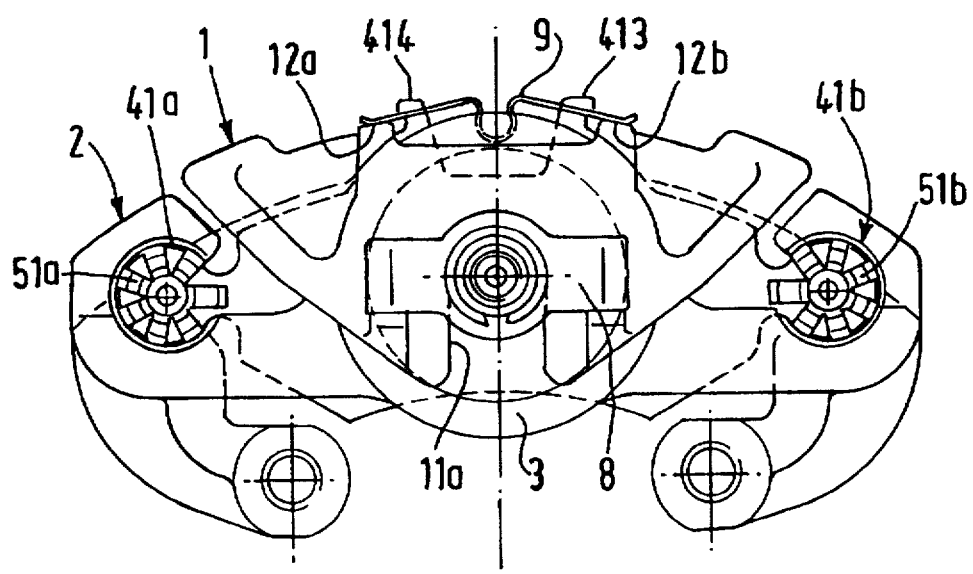
FIG. 2 is an external view of a complete braking device, in accordance with the invention, in the direction of the arrow II of FIG. 11.

In order to do this, as FIGS. 1, 2 and 11 show, the caliper 1 is fastened removably to the second pad 42 by means of a central spring 9.

Figure 10:
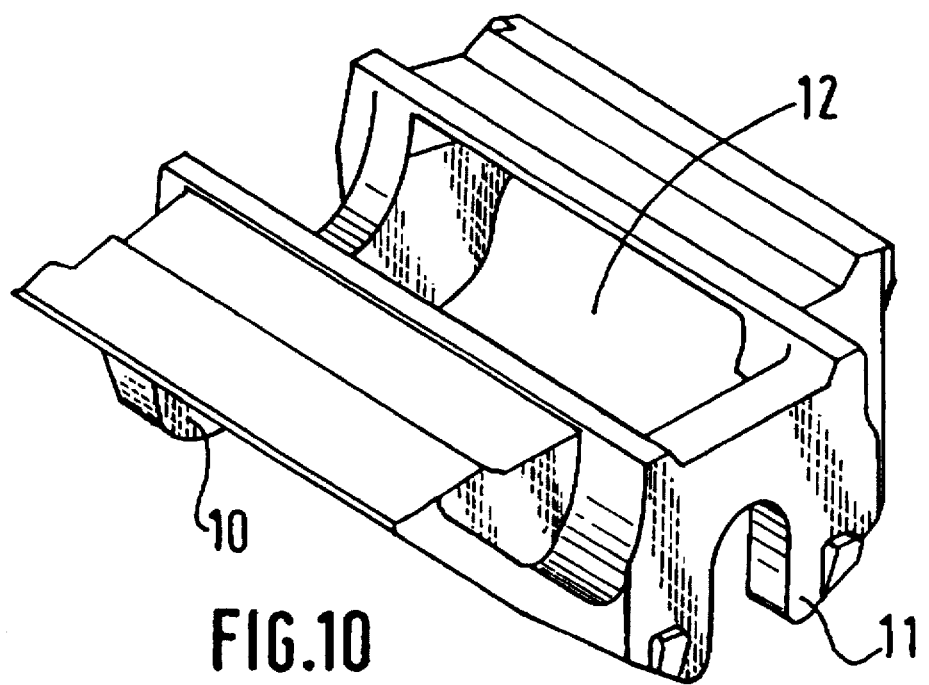
FIG. 10 is a perspective view of the caliper of a braking device in accordance with the invention, viewed from the side indicated by the arrow II of FIG. 11.

More precisely, the caliper 1 in its central part has an axial slit 12 (FIGS. 1 and 10) through which two projections such as 423 of the second pad 42 or 413 and 414 of the first pad 41 pass, and the central spring 9 is fastened onto these projections and bears on the edges 12a, 12b of the slit 12.

Under these conditions, the central part of the caliper 1 rests freely on the ring 23, guidance of the caliper with respect to the carrier being provided by keeping the bottom 11 of the caliper on the pressure inlet 32 and keeping the tip 10 of the caliper on the second pad 42, the latter itself being guided in the carrier.

We claim:

1. A braking device for a motor vehicle comprising:

first and second friction pads;

first and second brake elements which move with respect to each other, said first brake element being a caliper which straddles a brake disc and said second brake element being a carrier which is fixed to said vehicle;

clamping means including a cylinder which bears on said caliper and engaging a first face of first and second faces of said brake disc;

a piston located in and closing an opening in said clamping means;

guide means for allowing said caliper to slide with respect to said carrier in response to pressurized fluid being supplied to said opening in said clamping means, said first and second friction pads each having a central region, first and second lateral ears and connecting zones between said central region and said first and second lateral ears, said lateral ears each having a first width in a first direction substantially perpendicular to a second direction joining said lateral ears, said connecting zones each having a second width smaller than said first width in said first direction, said first and second lateral ears on each of said first and second friction pads being set into respective housings of said carrier, said first and second friction pads pointing respectively toward said first and second faces of said disc and being trapped between said piston and said caliper, said first and second friction pads being moved in a third direction by actuation of said clamping means in order to be applied to said first and second faces of said disc, said housing of said carrier extending in said third direction and having an opening pointing in a second direction, said housing opening having a size which is less than said first width, said caliper being fastened removably to said second pad in said first direction and radially with respect to said disc.

2. The braking device according to claim 1 wherein each of said lateral ears has a circular shape.

3. The braking device according to claim 2 wherein each of said lateral ears carries a lateral pad spring which essentially has a shape of a star comprising three branches, said spring being connected to said lateral ear by a central part which has a width larger than said first width.

4. The braking device according to claim 2 wherein said cylinder is engaged in a ring integral with said carrier and with respect to which said cylinder can slide under the effect of a braking force.

5. The braking device according to claim 2 wherein said caliper has a slit expending in said third direction, said second pad has at least one projection passing through said slit and a central spring fastened to said one projection bears on an edge of said slit.

6. The braking device according to claim 4 wherein said caliper rest freely on said ring.

* * * * *